United States Patent [19]

Gaiser

[11] 3,722,060

[45] Mar. 27, 1973

[54] MACHINE

[76] Inventor: Floyd E. Gaiser, 1701 East Carnegie Avenue, Santa Ana, Calif. 92705

[22] Filed: July 27, 1971

[21] Appl. No.: 166,530

[52] U.S. Cl. ....................................29/203 D
[51] Int. Cl. ....................................H05k 13/00
[58] Field of Search...29/203 R, 203 D, 203 P, 203 B

[56] References Cited

UNITED STATES PATENTS 3,636,610 1/1972 Williams..............................29/203 D

*Primary Examiner*—Thomas H. Eager
*Attorney*—Neinow & Frater

[57] ABSTRACT

The present invention relates to apparatus for the mass production of modules; and more particularly to the mass production of electronic modules adapted for use in an printed circuit board. The present application discloses apparatus for mass producing such modules by feeding suitable carrier strip formations onto an indexing trackway, utilizing suitable indexing fingers for moving said carrier strips along said trackway, cutting and forming carrier strip portions to desired configurations, severing the carrier strips to produce individual modules, disabling said machine while the carrier strip is moving or is improperly positioned, delivering the severed finished modules along an output trackway into suitable shipping containers, and salvaging any scrap metal that may comprise precious metals thereon. Mechanism is disclosed for providing said indexing fingers with strictly vertical movement, so that the carrier strips are not inadvertently moved in a horizontal direction. A unit, with suitable flexibility for handling various types and numbers of modules, is disclosed.

15 Claims, 23 Drawing Figures

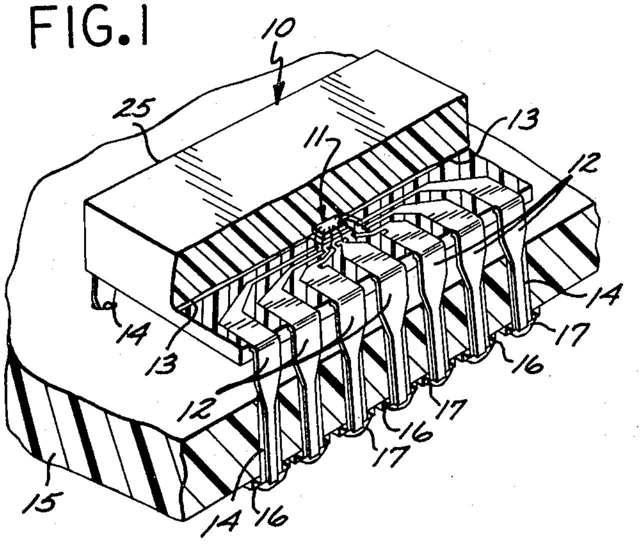
FIG. 1
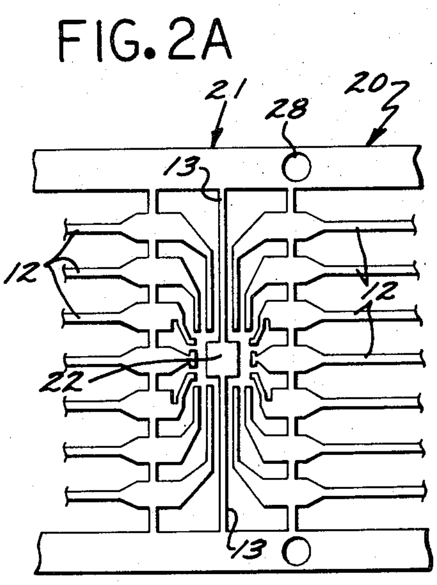
FIG. 2A
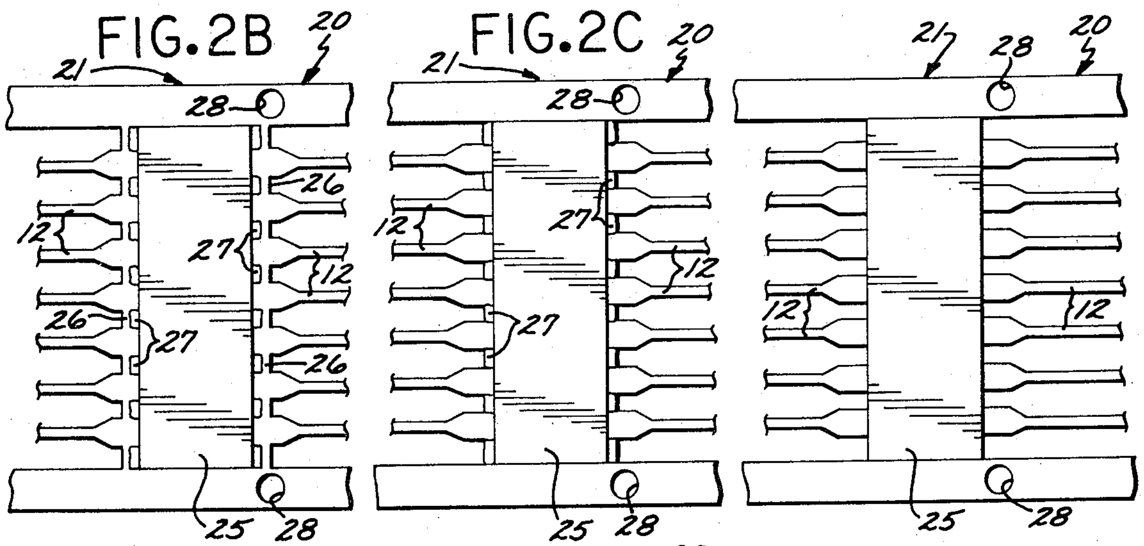
FIG. 2B FIG. 2C
FIG. 2D
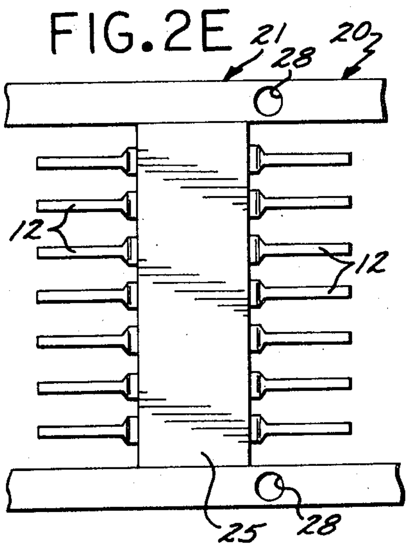
FIG. 2E
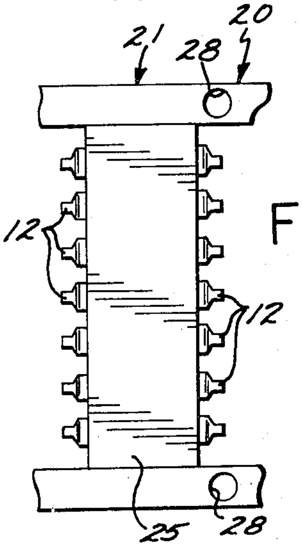
FIG. 2F
INVENTOR.
FLOYD E. GAISER
BY
Nienow & Frater
ATTORNEYS INVENTOR.
FLOYD E. GAISER
BY
Nienow & Frater
ATTORNEYS INVENTOR.
FLOYD E. GAISER
BY
Nienow & Frater
ATTORNEYS

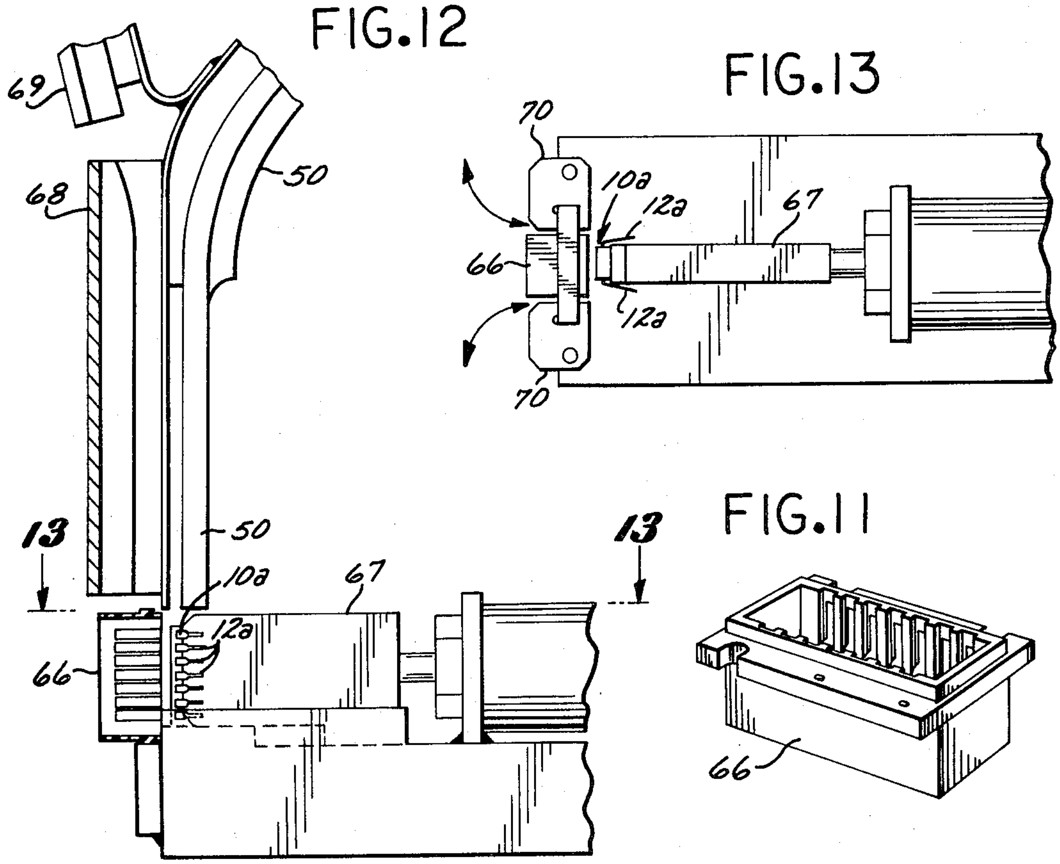
FIG. 11, FIG. 12, FIG. 13
FIG. 15
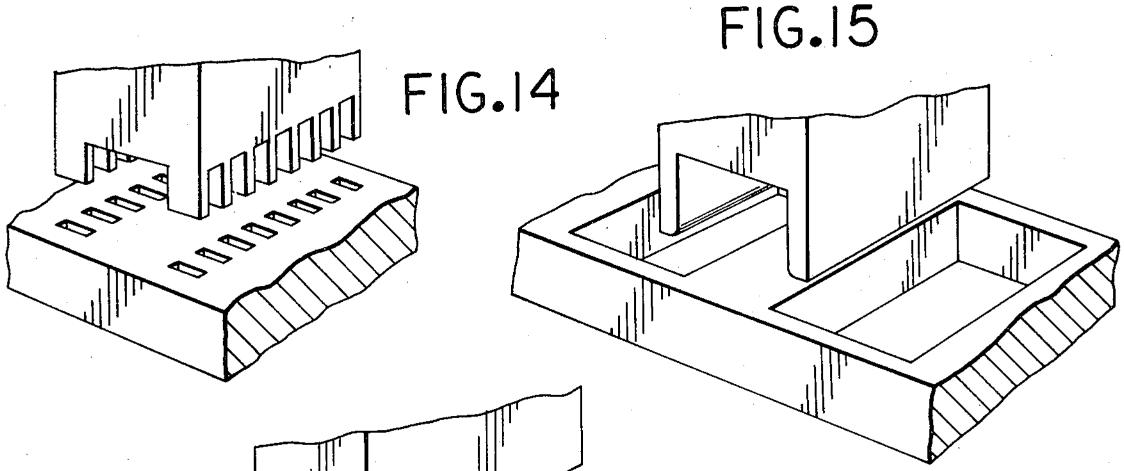
FIG. 14
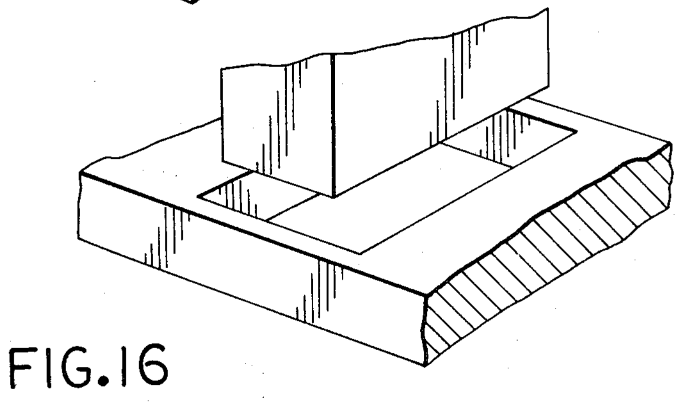
FIG. 16
INVENTOR.
FLOYD E. GAISER
BY
Meinow & Frater
ATTORNEYS

MACHINE

BACKGROUND

Much present day technology tends toward the use of so-called "modular elements" that are either completely self-contained or are able to be combined with other modular elements to form composite structures, systems, circuits, and the like. Early versions of this modular technique have been known as "Tinker Toy" or "Building Block" assemblies, but present day modular elements are not only complicated beyond belief of those outside of the particular field, but their uses are increasing at a tremendous rate. It therefore becomes essential to provide improved mass production techniques for producing such modular elements.

For simplicity of explanation, the following disclosure will be presented in terms of an electronic module, although, this presentation is not to be construed as limiting the present invention to this particular type of module.

DEVELOPMENT OF ELECTRONIC TECHNIQUES

It is well known that, in the past, electricity has been conducted from one point to another by means of wires and that, in the early days of electronics, this so-called "direct wiring" technique used individual wires that were individually routed to selected points of an electronic system. Soon after this, groups of wires were cut to suitable size and were pre-bundled to form a so-called "wire harness;" this harness then being dropped into an electronic chassis so that every wire would terminate where needed.

The next advance in the electronic arts was the use of "printed circuit boards" wherein the wires were replaced by patterns of thin conductive copper that looked as though they had been printed onto a baseboard. With the next advent, micro-miniaturization, the printed circuit board became a minute "electronic chip" that was about a sixteenth of an inch square and contained the wiring, the transistors, etc. that were necessary for that circuit.

About this time, it became desirable to enclose the electronic chip in a suitable casing to protect it from moisture, abrasion, corrosion, and the like; whereupon the encased electronic chip became known as an "electronic module." Many such electronic modules were designed for different electronic purposes; and therefore, their mechanical layout, their electrical characteristics, their arrangement of lead wires, etc. often differed from each other.

However, as these electronic modules became more widely accepted and ever more widely used, it became necessary to find ever better methods of mass producing them.

OBJECTS AND DRAWINGS

It is therefore the principal object of the present invention to provide improved apparatus for mass producing modules.

It is another object of the present invention to provide improved apparatus for mass producing electronic modules.

It is a further object of the present invention to provide improved apparatus for automatically mass producing electronic modules, and for placing the finished modules into suitable shipping containers.

The attainment of these objects and other will be realized from a study of the following detailed description, taken in conjunction with the drawings of which:

FIG. 1 shows a cutaway view of an electronic module;

FIG. 2A–2F show various stages of the carrier strip during the production of a module;

FIG. 11 shows a shipping socket;

FIG. 12 shows a side view of the shipping socket being filled;

FIG. 13 shows a top view of the shipping socket being filled;

FIGS. 14, 15 and 16 show typical punch and dies that are used for producing the modules.

DESCRIPTION

The Electronic Module

Figure 3A:
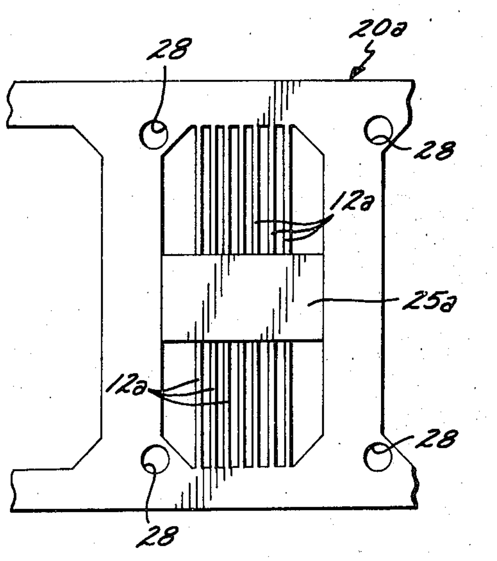
FIG. 3A and 3B show different types of modules.

As indicated above, the present disclosure will be presented in terms of an electronic module; and it will be recalled that such a module comprises a micro-miniaturized electronic chip that is to be connected to other electronic circuits and/or to other electronic elements.

FIG. 1 shows such an electronic module and the way it is electrically connected and mechanically held. In FIG. 1, electronic module 10 is shown in cutaway form to expose its electronic chip 11; seven electric "lead wires" 12 (actually strips of electrically conductive metal) being electrically connected to one side of the electronic chip 11 — seven more such lead wires (not visible in FIG. 1) being electrically connected to the other side of electronic chip 11. A support strap 13, to be discussed later, is also shown; but, in this illustration, support strap 13 is not being used at this time.

As shown in FIG. 1, the lead wires 12 are, internally of the module 10, in a "horizontal" orientation, but are shown to have their end portions bent downwardly, so that the end portions can project through openings 14 in a baseboard 15.

Baseboard 15 has on its lower surface (or on its upper surface) a printed circuit; this having apertured "pads" 16 of electrically conductive material into which the lead wires 12 fit. During the soldering operation, drops 17 of solder bridge across the individual leads 12 and their respective surrounding pad 16, to electrically interconnect them; thus, electrically connecting the electronic module 10 and its electronic chip 11 into the electronic circuit associated with baseboard 15. In this way, electronic module 10 is electrically connected and mechanically held; many different types of such modules often being mounted on baseboard 15.

As suggested above, the electronic modules often have different shapes, different lead wire configurations, and may serve different electrical purposes; so the illustration of FIG. 1 is to be taken primarily for purposes of explanation.

The Carrier Strip

FIGS. 2A – 2F illustrate portions of a "carrier strip" 20, portions such as these resulting during the production of an electronic module 10 discussed above. The carrier strip 20 of FIG. 2 is formed of any suitable material (usually stainless steel, for strength); and is often gold plated for desired electrical characteristics.

As illustrated in FIG. 2A, carrier strip 20 comprises a strip of material that has been suitably configurated, as by a punching or stamping process, into a series of frames 21, each frame serving as the basis for an electronic module of the type under discussion. As indicated in FIG. 2A, frame 21 has a central core 22 for holding one of the electronic chips 11 discussed above. Since the disclosed electronic chip has fourteen peripheral, minute, electrical terminations thereon, frame 21 therefore provides fourteen lead wires 12; these lead wires terminating adjacent to the periphery of central core 22. Later, 14 fine wires, are used to electrically connect the peripheral chip terminals to their respective lead wires, as illustrated in FIG. 1. Thus, as indicated in FIGS. 1 and 2, the configuration of frame 21 is such that leads 12 form continuous electrical connections between the terminals of the electronic chip 11 and the pads 16 of baseboard 15.

A support strip 13, of FIG. 2A, helps hold the central core 22 in place.

As suggested above, it is desirable to enclose or "encapsulate" the electronic chip 11 in order to protect it chemically, physically, and electrically from outside influences such as abrasion, moisture, electrical wires, corrosion, etc.; and this encapsulation is readily accomplished by forming a plastic body around the electronic chip, its terminals and connections thereto.

It has been found convenient (see FIGS. 1 and 2B) to produce such a plastic encasing body 25 by means of a molding operation; and, in order to provide an improved encasement 25, it has been found desirable to include into frame 21, a plurality of so-called "dam bars" 26 to dam the flow of the liquidized plastic. Without these dam bars 26, the liquidized plastic tends to escape around leads 12 and to form unsatisfactory encasements for the electronic chip. The use of the dam bars 26 limit the escape of the liquidized plastic to thin sheets of so-called "plastic flash" 27, as indicated in FIG. 2B.

The dam bars 26 also serve a secondary function; namely, they rigidify the overall frame 21 and leads 12, to provide improved handling characteristics for the carrier strip 20.

Thus, as indicated at FIG. 2B, a plastic encasement 25 is placed around each individual electronic chip, the chip leads 12 extending from the plastic body 25, to be used for making external electrical connections. In this way, a carrier strip 20 carries a series of frames 21; each frame forming a base for a module.

The carrier strip 20 preferably includes a plurality of indexing holes 28 that are suitably spaced along the edges of the carrier strip; these indexing holes 28 being used to intermittently advance the carrier strip 20 to pre-determined work stations in a manner to be discussed later. The indexing holes 28 are preferably arranged in pairs, to provide non-twisting advancement of the carrier strip.

In some cases, it may be desirable to use a "continuous" carrier strip wherein the carrier strip has a series of longitudinally spaced modules thereon; the carrier strip being rolled up on a reel or the like. In general though the preferred carrier strip takes the form of sections having about 10 modules per section.

Figure 3B:
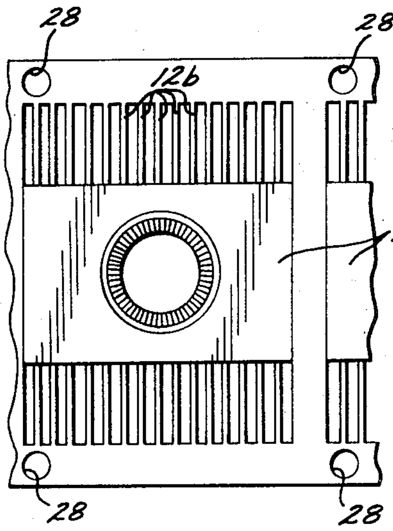

In order to provide a ready -to-use electronic module 10, it becomes necessary to clean up the module, to suitably bend its lead wires, and to free the finished module from the carrier strip 20; and these results are accomplished by the disclosed apparatus — FIGS. 3A and 3B showing some other types of electronic modules and lead wires that may be produced by the disclosed apparatus.

The Overall Apparatus

Figure 4:
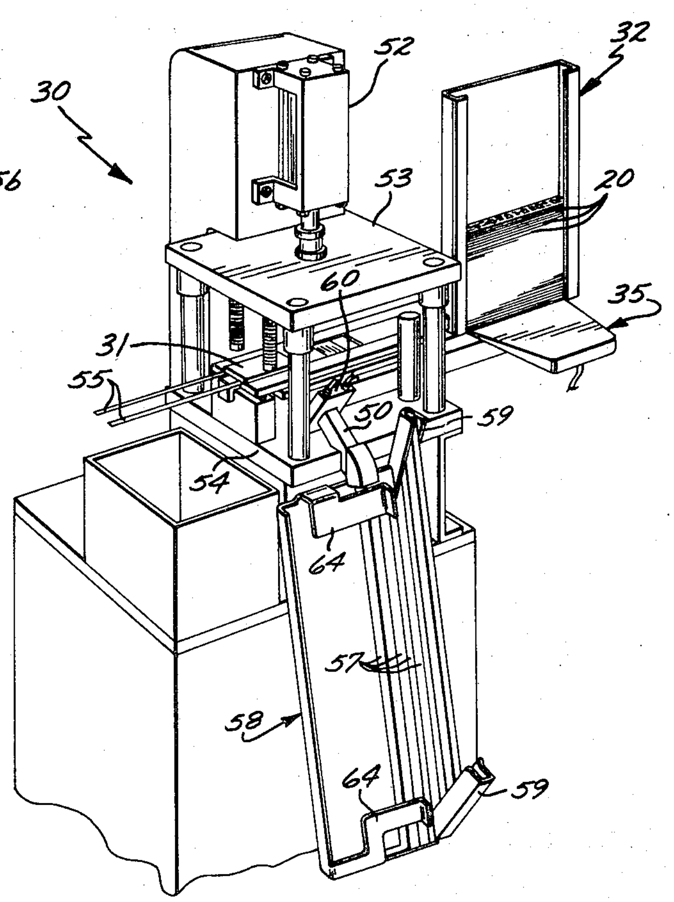
FIG. 4 shows a pictorial view of the apparatus.

FIG. 4 shows an overall view of the apparatus for mass producing the modules. The disclosed machine 30, parts of which will be discussed later in greater detail, accepts carrier strip of the types discussed above; and mass produces electronic modules at its output, meanwhile collecting the scrap metal for reclamation of the gold or other precious metal that may have been used. The machine may be energized by any suitable source of power (electric, pneumatic, hydraulic, etc.); and would be provided with suitable controls.

Machine 30 will accept a carrier strip of either the continuous type or the sectional type. If the continuous type of carrier strip is to be used, the continuous carrier strip is fed from its reel directly onto an indexing trackway 31, along which the carrier strip and its frames move.

If the sectional type of carrier strip is to be used, the sections of carrier strips 20 are stacked vertically into a storage magazine 32 of FIG. 4. In some cases it may be desirable to place a weight on top of the stacked carrier strips 20 in order to retain their flatness; but, if the storage magazine 32 has a sufficiently large capacity, the weight of the carrier strips cause the bottom-most carrier strips to retain their flatness.

A feeding mechanism 35 (covered in FIG. 4; but to be described later in greater detail) feeds the bottom-most carrier strip 20 in storage magazine 32 onto the indexing trackway 31. It should be noted that these carrier strips, being stacked in a vertical relation in storage magazine 32, have the flat tops and flat bottoms of their plastic encasements 25 abutting each other; and since the plastic surfaces are fairly smooth and slippery, the feeding of the bottom-most carriage strip onto the indexing trackway 31 does not pose any problem.

The Carrier Strip Feeding Mechanism

Figures 5, 6, 7, 8, 9, 10, 17:
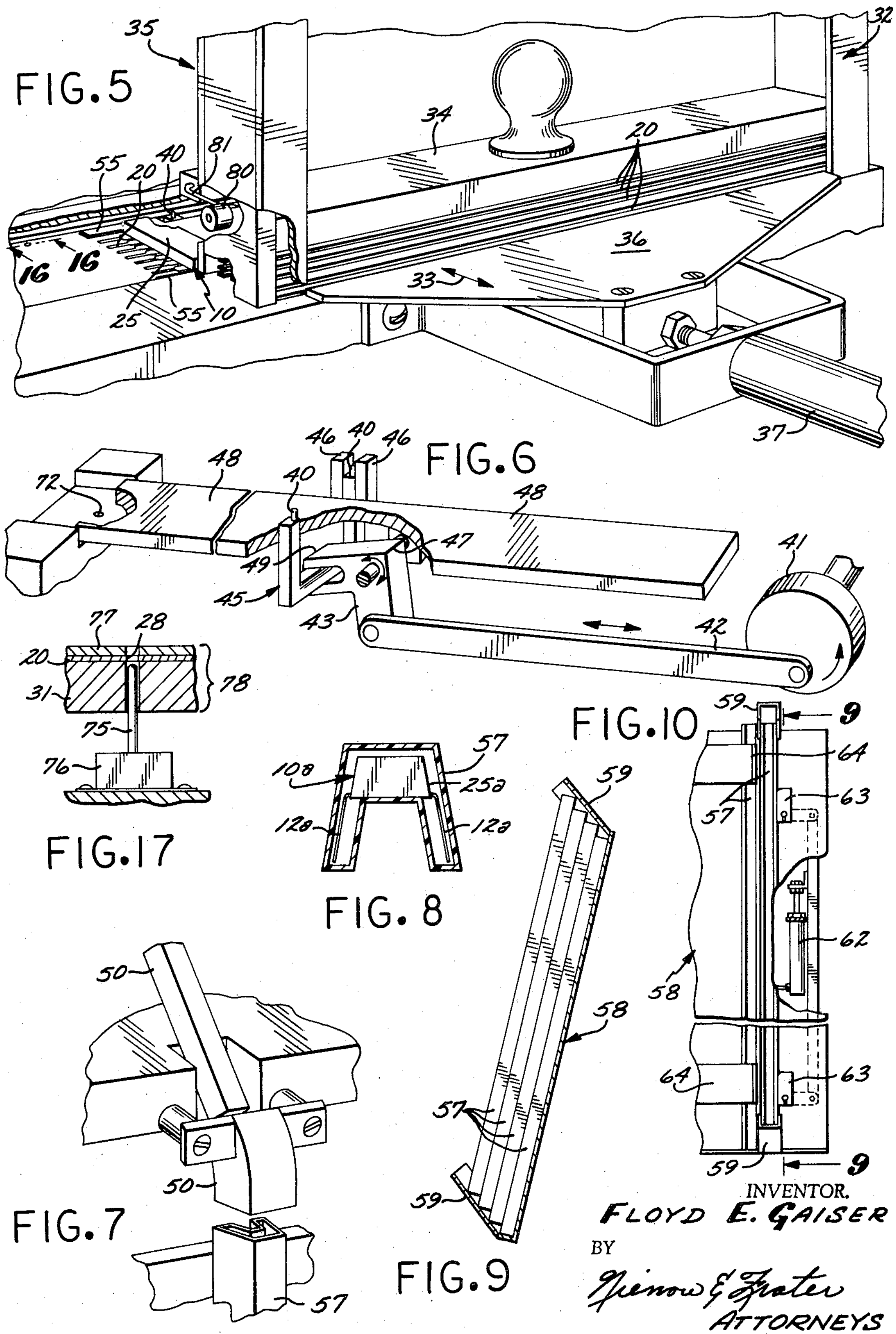
FIG. 5 shows a pictorial view of mechanism for feeding the carrier strips.
FIG. 6 shows a pictorial view of mechanism for intermittently advancing the carrier strips to sequential work stations.
FIG. 7 shows a pictorial view of a shipping stick for receiving the finished modules.
FIG. 8 shows a partial cross-sectional view of a shipping stick and a received module.
FIG. 9 shows a partially cross-sectional view of an arrangement for holding the shipping sticks.
FIG. 10 shows an arrangement for removing filled shipping sticks, and substituting empty shipping sticks.
FIG. 17 shows a safety pin for use as a protective device.

While the feeding mechanism 35 may take any of a number of forms, one satisfactory form shown in FIG. 5 has a pusher 36 that moves as indicated by the double ended arrow 33; the forward movement of pusher 36 engaging practically the entire longitudinal edge of the bottom-most carrier strip 20. Pusher 36 is actuated by a At the fourth work station the now cut leads 12 are bent over (formed) as indicated in FIG. 2F — although this lead bending operation may be done as part of the above described lead cutting operation.

Incidentally, the removal of the plastic flash 27 facilitates bending the leads at the desired place, and to the desired angle. At the fifth work station, a suitable punch (see FIG. 16) severs the support strap 13 shown in FIG. 2A; so that the now severed module appears as indicated in FIG. 1.

It has been found that a three station progressive punching operation is capable of performing all of the described operations; although, as indicated above, fewer or more numerous work stations may be used — depending upon the design of the carrier strip and module, power requirements, etc.

It should be noted at this time, that in some modules the leads are to be bent downwardly; in other modules the leads are to be bent upwardly; and in still other modules some of the leads are to be bent upwards while other leads of the same module are to be bent downwards; and that in still other modules, so-called "-heat sink " wires are to be bent in specified directions. These configurations can be provided by suitable punches.

At the final work station, the modules are severed from the carrier strip and the now severed module falls onto an output trackway 50 of FIG. 4; leaving the carrier edges 55 to be deposited in a container for reclamation of the plating gold or other valuables that may be present.

As may be realized, the punching processes at the various work stations produce a large volume of punch chips; these being the residue from the dam bars, from the plastic flash, etc. In order to avoid the danger of having these residue chips packed into the punches or other mechanisms, a vacuum system is provided for their removal; one such vacuum system comprising an industrial type vacuum pump and container that has vacuum conduits to the various parts of the machine that are to be so protected.

Output

It will be apparent that when modules such as those under discussion are packed in a box-like shipping container, they will have to be later removed and oriented for use; and that much of the work will have to be performed manually. Moreover, some of the modules may be received in a damaged condition; and other will be damaged during their handling.

One way of obviating these problems in shown in FIGS. 4 and 7.

FIG. 4 shows an output trackway 50, which receives the severed modules from the final work station; the bent leads of the modules co-acting with gravity to seat and orient the modules on the output trackway 50. As indicated, the output trackway 50 is suitably slanted and curved in a vertical direction; so that the oriented and seated modules slide downward along the output trackway 50 to its discharge end.

At the lower end of the output trackway 50, there is positioned a shipping container — the simplest form of which would be an ordinary box; but, as indicated above, this box-type shipping container may not be the most desirable or cheapest way of shipping the modules.

Directing attention now to FIG. 7, this shows that output trackway 50 has a hollow elongated "shipping stick" 57 positioned at its lower discharge end; the hollow center portion of shipping stick 57 having a cross-section that is complementary to the cross-section of the module. Thus, the individual modules slide from the end of the output trackway 50 directly into the hollow center portion of the shipping stick 57 located at the loading position; the modules being held in the shipping stick by any suitable means (e.g., detent, spring, pressure sensitive tape, or the like). Thus, the shipping stick 57 positioned at the loading position is automatically filled with modules; and holds these modules safely for inventory, shipping, etc.

FIG. 8 shows a partially cross sectional view of the shipping stick 57 with a contained module 10*a*, to show how the module fits into a protected environment provided by the shipping stick. It will be noted that the contained module 10*a* has slightly flared leads 12*a* and a tapered encasement body 25*a*, in this way differing slightly from the module 10 discussed above. In any case, the shipping stick has a suitable interior for receiving the module.

Referring back to FIG. 4, it will be seen that a shipping stick holder 58 is positioned adjacent to the output end of output trackway 50; the shipping stick holder 58 comprising a pair of angled guide grooves 59. A plurality of empty shipping sticks 57 are placed into the guide grooves 59 and become aligned as indicated in FIGS. 4 and 9.

As the shipping stick in the loading position accumulates modules therein, a sensor (60 of FIG. 4), which may be a counter, senses when the shipping stick at the loading position is actually filled with modules. A signal from sensor 60 then actuates a piston 62 of FIG. 10, which extends to pivotally move each of the pivot arms 63 to push the now filled shipping stick sidewise out of the loading position, and into a retaining location of holder 58; the filled shipping stick being retained there by suitable springs such as 64. Pivot arms 63 also push the bottom-most empty shipping stick of the aligned stack of empty shipping sticks in guide grooves 59 into the loading position.

In this way, a series of shipping sticks is automatically filled; thus holding a plurality of modules in safe repository.

Another type of shipping container is illustrated in the side view of FIG. 11; this one comprising a "-shipping socket" 66 into which an individual module is to be placed. As indicated in FIG. 12, as each individual module 10*a* becomes available at the discharge end of output trackway 50, a suitably shaped plunger 67 forces the now available module 10a into a pre-positioned shipping socket 66 that had been provided by means such as a guide chute 68 and a hopper 69.

FIG. 13 is a top view of the socket filling mechanism. This indicates a pair of spring loaded members 70 that accept an empty shipping socket 66 from chute 68; hold the shipping socket 66 while the module 10*a* is being inserted therein; and then pivot away as indicated by the arrows to release the now filled shipping socket 66. The resiliency of the module leads 12*a* holds the module in its own individual protecting shipping socket 66. These filled shipping sockets 66 may now be dropped into a shipping box.

piston 37 under conditions to be discussed later, so that the bottomamost carrier strips are moved successively out of storage magazine 32 onto indexing trackway 31; thus, producing a continuous train of carrier strips. One such "moved" carrier strip 20 is shown on indexing trackway 31; pusher 36 having been retracted. A weight 34 is shown to be used for the last few carrier strips 20.

The Indexing Fingers

Once a carrier strip 20 has been pushed from the storage magazine 32 onto the indexing trackway 31, a plurality of indexing fingers (such as 40 of FIG. 5) are energized to engage selected indexing holes 28 of the carrier strip; these indexing fingers 40 then moving, in a manner to be discussed later, to intermittently advance the carrier strip 20 leftward along the indexing trackway 31.

It will be realized that at least one indexing finger 40 is desirable for moving the carrier strip from the position where it has been left by the pusher 36 of the storage magazine 32; that at least one other indexing finger 40 is desirable for removing the carrier strip from its final position on the indexing trackway 31; and that at least one intermediately positioned indexing finger 40 may be desirable for moving the carrier strips of the train of carrier strips along the indexing trackway 31. Thus, the required number of indexing fingers depends upon the length of the indexing trackway 31, on the size of the carrier strip, on the speed of carrier strip movement, on the placement of the indexing holes, etc. In one machine, it has been found that three pairs of indexing fingers are adequate.

The Indexing Mechanism

As indicated above, the indexing fingers 40 (for engaging the pairs of indexing holes 28) intermittently advance the carrier strip 20 leftward along the indexing trackway 31; meanwhile stopping the carrier strip at pre-determined work stations on the indexing trackway 31, so that desired operations may be performed at these work stations. Therefore, the carrier strip indexing achieved by the indexing fingers 40 must be precise.

The indexing mechanism shown in FIG. 6 has been found to be very satisfactory for this purpose. This indexing mechanism comprises a rotating motor disc 41 that drives a reciprocating crank arm 42; the resulting "simple harmonic motion" providing rocker 43 with a gentle oscillating motion having minimal shock. Rocker 43 pivots arcuately around a pivot pin; a slot in rocker 43 producing vertical motion of an indexing finger yoke 45 - strictly vertical motion of a pair of indexing fingers 40 atop the indexing finger yoke 45 being assured by the use of guides 46.

The operation of the indexing mechanism of FIG. 6 is as follows. When the rotation of disc 41 has brought the crank arm 42 to the position indicated in FIG. 6, the rocker 43 is "locked" by having its corner 47 abut the lower surface of the indexing slide 48. The counter clockwise rocker action is thus terminated; the indexing fingers 40 being in their most downward position.

As the disc 41 rotates farther, the rightward movement of the crank arm 42 causes rightward movement of the "locked" rocker 43, the yoke 45, and the slide 41. In this way, the lowered indexing fingers 40 are moved to their extreme rightward position, preparatory to subsequent advancement of the carrier strip to the left.

As disc 42 continues to rotate, the crank arm 42 now moves to the left; this leftward movement of the crank arm now unlocking the rocker 43 — and causing it to now rock in a clockwise direction. This clockwise rocking motion causes the yoke and indexing fingers to move directly upward between guides 46. Their vertical movement causes the indexing fingers 40 to enter selected indexing holes 28 (not shown) of a carrier strip without imparting any horizontal movement to the carrier strip.

Once the indexing fingers 40 have moved to their uppermost vertical position, the other corner 49 of rocker 43 locks itself against the lower surface of the indexing slide 48 preventing further rocking movement. Subsequent rotation of disc 41 now produces leftward movement of the "locked" rocker 43, the yoke 45, and the slide 48; thus causing the indexing fingers 40 to advance the carrier strip leftward to a subsequent work station.

When the carrier strip has been fully advanced leftward, subsequent rotation of the disc 41 unlocks the rocker; and its reversed rocking action now causes the indexing fingers 40 to be moved downward in a vertical direction, so that the indexing fingers 40 are withdrawn vertically from the indexing holes of the carrier strip without imparting any horizontal movement of the carrier strip; this position being the one illustrated in FIG. 6.

Further rotation of the disc 41 causes the now withdrawn indexing fingers 40 to be moved to the right; preparatory for their next indexing movement.

As indicated above, several indexing fingers (or pairs of indexing fingers) may be desired, and to achieve this result, a plurality of such indexing mechanism may be linked together although a single indexing slide 48 is preferred.

The Punching Operation

Referring back to FIG. 4, this shows machine 30 to comprise apparatus for a punching operation; this apparatus comprising a power sylinder 52 that drives a punch assembly 53 downwards toward a punch bed 54 — the punches and dies having been omitted from the drawing for clarity of illustration. Suitable guides, stops, power springs, etc. are indicated.

The punching operation is preferably of the progressive type wherein the work piece (carrier strip in this case) is advanced intermittently to successive work stations; suitable punches performing given operations at the various work stations.

When a frame of a carrier strip is at the first work station, a suitable punch (see FIG. 14) is used to punch out the dam bars 26 shown in FIG. 2B; so that the carrier strip frame then appears as in FIG. 2C. At the second work station, another similar punch is used to remove the plastic flash 27 shown in FIG. 2C; so that the frame then appears as shown in FIG. 2D — although the plastic flash removal may be performed as part of the above described dam bar removal operation, if so desired. At the third work station, a suitable punch (see FIG. 15) is used for cutting the leads 12 shown in FIG. 2D; so that the frame appears as indicated in FIG. 2E.

When the module is to be used, it is merely forced out of its shipping socket 66 in the direction opposite its entry so that the module emerges from the shipping socket in a lead first/body last manner; its leads going directly into suitably located apertures of a printed circuit board.

Protective Devices

As is well known in the field of machinery design, it is imperative to install protective devices to protect both the machinery, and the work pieces. The present apparatus comprises two such protective devices.

First of all, it is readily realized that the apparatus should be disabled, or made inoperative unless the carrier strip is in its correct location to be worked upon; and this situation arises at two distinct times. One of these times is when the carrier strip is moving between work stations.

To avoid this situation, a protective device 72 of FIG. 6 is located to be suitably activated when the indexing slide 48 of FIG. 6 is at the extreme left end of its stroke. Protective device 72 may take any of a number of forms; such as an electric switch, an aperture that controls a vacuum or pressure, or the like.

Because of protective device 72, the indexing slide 48 of the indexing mechanism must be at rest in the extreme forward portion of its movement and thus the carrier strip must be at rest before the punching operation can be initiated.

Secondly, one or more "safety pins" are positioned so that when the carrier strip is stationary, and is ready to be punched, the safety pin must protrude through a selected indexing hole 28. If the safety pin does not protrude in this manner, a second protective device is actuated to disable the machine.

FIG. 17 illustrates one type of safety pin. Here, a safety pin 75 is part of or associated with a device such as a switch 76 that may be fastened to bed 54 of FIG. 4. FIG. 17 illustrates the safety pin 75 as protruding almost through the indexing trackway 31. A carrier strip 20 is shown to have its indexing hole 28 aligned with safety pin 75; an optional cover plate 77 being used to cover the train of carrier strips.

When the punch assembly 53 of FIG. 4 is lowered, the upper combination 78 of FIG. 17 is also lowered. In the illustrated case, the safety pin 75 will protrude through all the aligned holes; so that switch 76 will retain its normal state. However, if the indexing hole 28 were misaligned, the solid portion of the carrier strip 20 would depress the safety pin 75; so that switch 76 would disable the machine.

Thus, the punching operation is inhibited unless the carrier strip fulfills the two safety requirements; namely, it must be stationary, and its indexing holes must be properly positioned with respect to the punching assembly.

Feeding Mechanism Actuator

It was pointed out previously that a feeding mechanism 35 feeds a new carrier strip onto the indexing trackway 31 when such a new carrier strip is needed to provide continuous mass production. One way to achieve this desired feeding condition is to have a sensor that controls the feeding mechanism 35. This sensor may be a counter that counts the indexing movements that have taken place since the last carrier strip was placed on the indexing trackway; the sensor then actuating the feeding mechanism 35 to provide a new carrier strip. Unfortunately, this counter type sensor does not work well with the continuous carrier strips discussed previously.

An improved feeler type sensor is shown in FIG. 5, sensor 80 being a cylinder that rides on top of the plastic bodies 25 of the carrier strip 1; its sensor arm 81 being connected to a switch that produces a sensor signal when such a plastic body is absent, which would happen if the machine were about to run out of stock.

Such a feeler type sensor may be used to actuate the feeder mechanism 35 when a new carrier strip is needed; or else it may be used to sound a warning when the continuous type carrier strip has been used up.

What is claimed is:

1. A cutting and forming machine for producing modules from a carrier strip having spaced indexing holes, comprising:

- means for feeding said carrier strip onto an indexing trackway;
- indexing means, comprising a plurality of indexing fingers, for moving said carrier strip intermittently along said indexing trackway;
- movement sensing means for disabling said machine while said indexing means is moving said carrier strip along said indexing trackway;
- position sensing means for disabling said machine when said carrier strip is improperly positioned;
- means for providing said indexing fingers with a strictly vertical movement whereby said indexing fingers enter said indexing holes in a substantially vertical direction, and do not move said carrier strip horizontally;
- means for providing said indexing fingers with a horizontal movement whereby said indexing fingers, having entered said indexing holes of said carrier strip, move said carrier strip horizontally a predetermined distance;
- means, comprising a plurality of progressive dies, for cutting and forming said modules, and for severing individual said modules from said carrier strip;
- output means for guiding said severed modules along an output trackway into a shipping container.

2. The combination of claim 1 wherein said carrier strip comprises a continuous roll of longitudinally spaced modules, said continuous roll carrier strip being rolled up on a reel or the like for providing individual said carrier strips.

3. The combination of claim 1 wherein said carrier strip comprises a longitudinal strip of a given length.

4. The combination of claim 3 including storage means, comprising a magazine, for storing a plurality of stacked carrier strips.

5. The combination of claim 4 including feeding means for feeding selected ones of said stacked carrier strips onto said indexing trackway.

6. The combination of claim 1 wherein said shipping container comprises a hollow shipping stick having a cross-section that is complementary to the cross section of said module.

7. The combination of claim 6 including means for causing said output means to fill said shipping stick with modules.

8. The combination of claim 7 wherein said output means comprises means for indicating when said shipping stick has been filled.

9. The combination of claim 8 including means for removing said shipping stick when said shipping stick has been filled.

10. The combination of claim 9 including means for replacing said filled shipping stick with an empty shipping stick to be filled by said output means.

11. The combination of claim 1 wherein said shipping container comprises a hollow shipping socket having a cross section that is complementary to the cross section of said module.

12. The combination of claim 11 including inserting means for inserting individual said modules from said output trackway into respective said shipping sockets.

13. The combination of claim 12 wherein said inserting means comprises plunger means for forcing said modules into said shipping sockets.

14. The combination of claim 1 including sensing means for sensing when a new carrier strip is to be fed to said indexing trackway.

15. The combination of claim 14 including means, activated by said sensing means, for actuating said feeding means to feed a carrier strip onto said indexing trackway.

* * * * *